United States Patent [19]

Dohi

[11] Patent Number: 5,544,746
[45] Date of Patent: Aug. 13, 1996

[54] BELT FOR HOLDING A TRAIN OF SCREWS

[75] Inventor: Yuji Dohi, Toyonaka, Japan

[73] Assignee: Japan Power Fastening Co. Ltd., Osaka, Japan

[21] Appl. No.: 321,107

[22] Filed: Oct. 11, 1994

[30] Foreign Application Priority Data

Oct. 13, 1993 [JP] Japan .................. 5-055376 U

[51] Int. Cl.⁶ .................................................. B65D 85/24
[52] U.S. Cl. ............................... 206/346; 206/347
[58] Field of Search ............................. 206/343, 345, 206/346, 347, 338

[56] References Cited

U.S. PATENT DOCUMENTS

| 2,877,681 | 3/1959 | Brown . | |
|---|---|---|---|
| 3,097,360 | 7/1963 | Carlson, Jr. et al. | 206/347 X |
| 3,211,284 | 10/1965 | Anstett | 206/347 X |
| 3,892,313 | 7/1975 | Lange | 206/346 |
| 4,059,034 | 11/1977 | Hornung . | |
| 4,955,476 | 9/1990 | Nakata et al. | 206/346 |
| 5,437,368 | 8/1995 | Mikels | 206/347 X |

FOREIGN PATENT DOCUMENTS

| 0532819 | 3/1993 | European Pat. Off. . | |
|---|---|---|---|
| 2317542 | 2/1977 | France . | |
| 2622177 | 4/1989 | France . | |
| 2411184 | 9/1974 | Germany | 206/347 |
| 9305336 | 8/1994 | Germany . | |
| 58-47299 | 10/1983 | Japan . | |
| 449367 | 11/1992 | Japan . | |
| 492524 | 8/1970 | Switzerland | 206/347 |

*Primary Examiner*—Bryon P. Gehman
*Attorney, Agent, or Firm*—Michael D. Bednarek; Kilpatrick & Cody

[57] ABSTRACT

A resinous belt is provided for holding a train of screws each having a shank and a head. The belt comprises a series of screw retaining bores formed in the belt at a predetermined pitch longitudinally of the belt. Each screw retaining bore has a diametrically smaller shank retaining portion for engagement with the screw shank, and a diametrically larger root portion which has a first edge adjoining the shank retaining portion and a second edge remote from the shank retaining portion. The screw retaining bore is surrounded by a plurality of removal facilitating holes formed in the belt. The root portion of the screw retaining bore is located radially outside an imaginary cone which contains the first and second edges of the root portion.

9 Claims, 5 Drawing Sheets

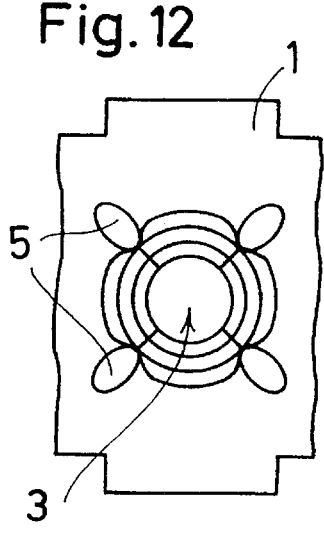
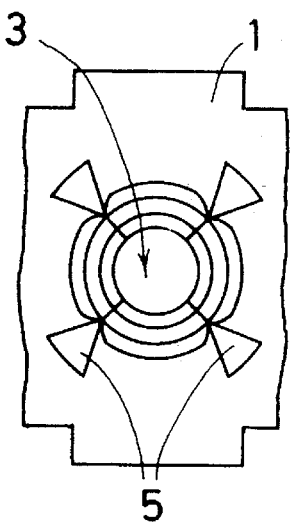
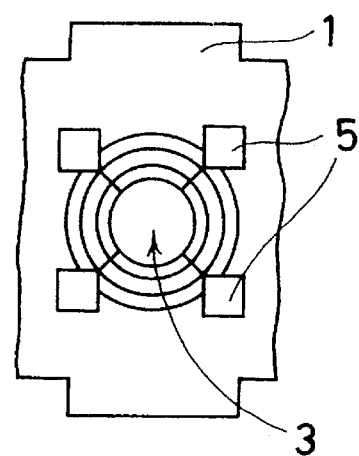
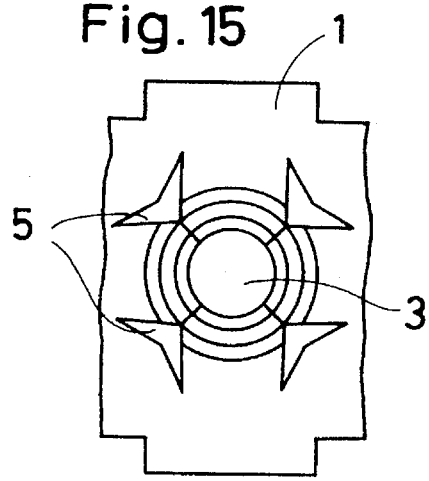
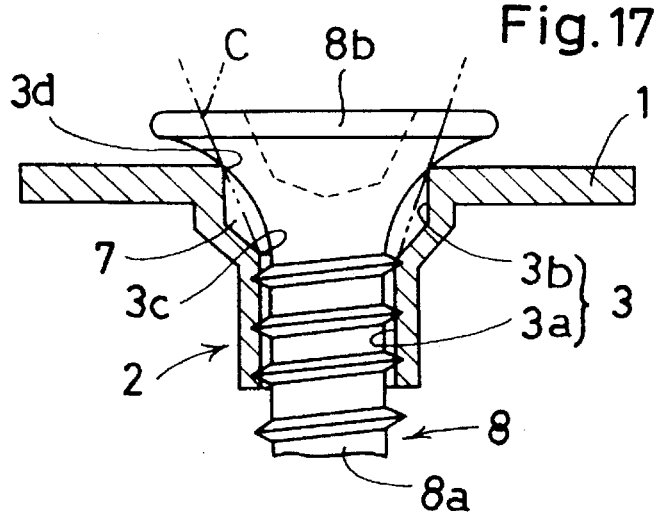
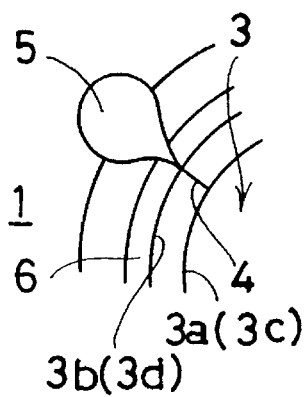
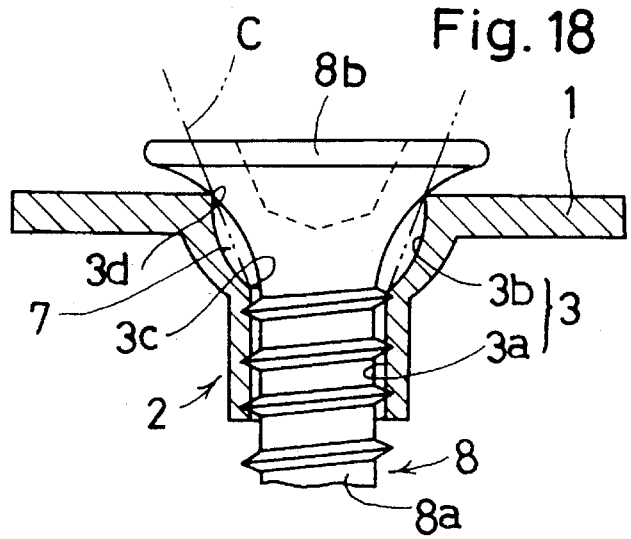

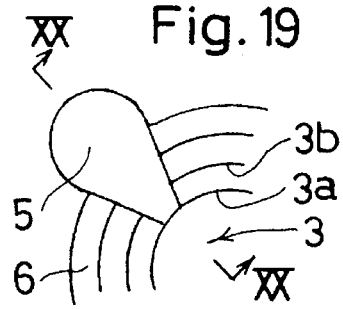
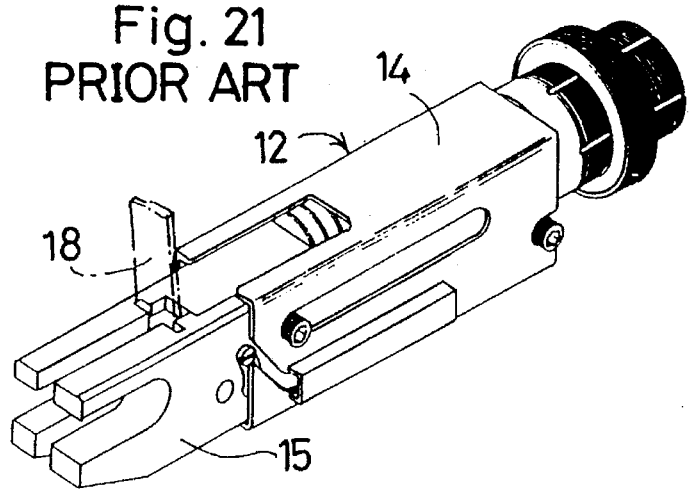
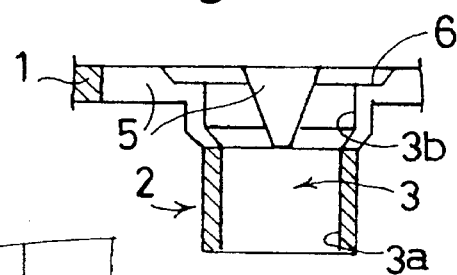
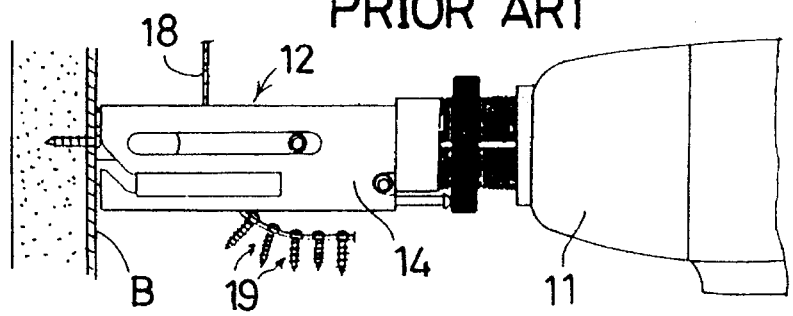
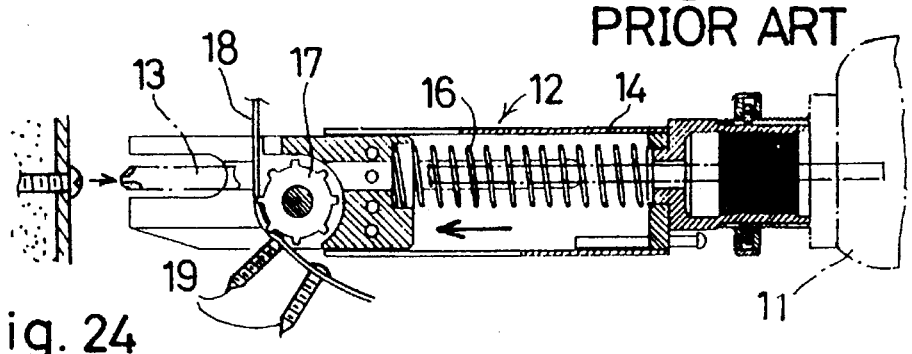
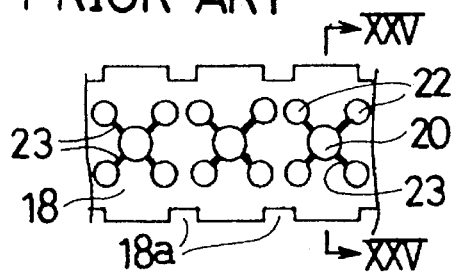
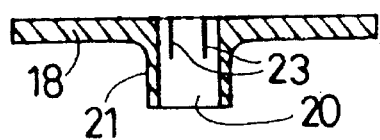

BELT FOR HOLDING A TRAIN OF SCREWS

BACKGROUND OF THE INVENTION

1. Field of the Invention

This invention relates to a resinous belt for holding a train of screws. More specifically, the present invention relates to a screw train holding belt which is used in an automatic screw driver for successively feed screws.

2. Description of the Prior Art

As often experienced by many people, manual screw driving is a laborious and time-taking job. In particular, the screw driving job can be a serious trouble when it must be done extensively for a long time. For this reason, it has become a common practice to use an automatic screw driver when the screw driving job must be done extensively.

For the convenience of description, a typical example of automatic screw driver is illustrated in FIGS. 21 through 23 of the accompanying drawings. A similar screw driver is also disclosed in U.S. Pat. No. 4,059,034 to Hornung.

As shown in FIGS. 21–23, the prior art automatic screw driver mainly comprises a screw driver main 11 and a screw feeding attachment 12 removably connected to the driver main 11. The driver main 11 carries a driver bit 13 which is rotated by a built-in motor (not shown).

The screw feeding attachment 12 has an elongate case 14 and a slider 15 slidably fitted in the case 14. The slider 15 is always urged forward by a coil spring 16 and carries a pair of indexing sprockets 17 (only one shown) for indexing a screw train holding belt 18 which is made of a soft synthetic resin. The screw train holding belt 18 carries a train or series of screws 19 and has pairs of notches 18a for engagement with the pair of indexing sprockets 17 of the screw feeding attachment 12, as shown in FIG. 24.

In use, the slider 15 is held in abutment with a suitable portion of an object B (see FIG. 22), and the driver main 11 is pressed forward. As a result, the case 14 together with the driver bit 13 in rotation advances to drive a screw 19 (in front of the driver bit 13) of the screw train holding belt 18 into the object B while allowing the slider 15 to retreat into the case 14 against the coil spring 16.

Upon finishing a screw driving operation, the driver main 11 is brough away from the object B, thereby allowing the slider 15 to return to its initial position by the storing force of the coil spring 16. Such a returning movement of the slider 14 causes the sprockets 17 to index the screw train holding belt 18 for bringing another screw 19 to a position in front of the driver bit 13.

As shown in FIGS. 24 and 25 (and as disclosed in Japanese Utility Model Publication No. 4(1992)-49367 for example), the screw train holding belt 18 has a series of screw retaining bores 20 at a constant pitch longitudinally of the belt. Each of the screw retaining bores 20 is defined by a tube 21 integral with the belt 18 for engagement with the threaded shank of the corresponding screw 19. Further, the screw retaining bore 20 is surrounded by a plurality of removal facilitating holes 22 communicating with the bore 20 via respective cuts or slits 23. The removal facilitating holes 22 and the cuts 23 cooperate to facilitate passage of the enlarged head of the screw 19 through the screw retaining bore 20 at the time of driving the screw 19.

When the head of the screw 19 has a flat bottom, the screw train holding belt 18 shown in FIGS. 24 and 25 has been found to work well because the screw head can rest stably on the flat surface of the belt to maintain the screw 19 perpendicular to the belt. However, if the screw 19 has an undercut or countersunk head which cannot stably rest on the flat belt surface, it becomes difficult for the belt to hold the screw 19 with correct orientation.

FIGS. 26 through 30 of the accompanying drawings show another screw train holding belt 18' which is already known. Such a belt is disclosed in Japanese Utility Model Publication No. 58(1983)-47299 for example.

As shown in FIGS. 26–30, the belt 18' is formed with a series of screw retaining bores 20' each defined by a tube 21' integral with the belt. The screw retaining bore 20' has a shank retaining portion 20a' (see FIG. 29) for engagement with the threaded shank 19a of the screw 19, and a conical root portion 20b' for coming into face to face contact with the countersunk head 19b.

According to the arrangement described above, since the screw 19 is supported at both of the shank 19a and the head 19b, it is possible to hold the screw 19 correctly perpendicular to the belt 18'. However, this prior art belt is still disadvantageus for the following reasons.

As shown in FIGS. 27–29, each screw retaining bore 20' of the screw train holding belt 18' is formed by a burring method which uses a punch 24 and a die 25. The punch 24 has a diametrically smaller shaft portion 24b and a diametrically larger conical portion 24b. Similarly, the die 25 has a diametrically smaller bore portion 25a and a diametrically larger conical bore portion 25b. Apparently, the screw retaining bore 20' is formed by plastic deformation of the belt material caused by pressing the punch 24 into the die 25 (see FIG. 28).

However, since the belt 18' is inherently elastic, the conical root portion 20b' tends to spring-back slightly upon drawing the punch 24 out of the die 25, as appreciated by comparing FIG. 28 with FIG. 29. Thus, it is difficult to form the conical root portion 20b' of the screw retaining bore 20' with dimensional accuracy.

When the screw 19 is fitted into the thus formed screw retaining bore 20', the conical root portion 20b' of the bore 20' must elastically deform for coming into full face to face contact with the countersunk head 19b of the screw 19. As a result, the belt 18' is stressed longitudinally thereof, which causes longitudinal warping of the belt 18', as shown in FIG. 30. Apparently, such warping hinders smooth feeding movement of the belt 18' through the screw feeding attachment 12 (FIGS. 21–23).

A similar problem also occurs when the belt 18' is used for holding screws having a countersunk head of a different countersink angle. Further, the conical root portion 20b' of the screw retaining bore 20' cannot adapt to a non-conical undercut screw head.

SUMMARY OF THE INVENTION

It is, therefore, an object of the present invention to provide a screw train holding belt which makes it possible to reliably perform a screw driving operation with ease.

According to one aspect of the present invention, there is provided a resinous belt for holding a train of screws each having a shank and a head, the belt comprising: a series of screw retaining bores formed in the belt at a predetermined pitch longitudinally of the belt, each of the screw retaining bores being defined by a tube, said each screw retaining bore having a diametrically smaller shank retaining portion for engagement with the shank of the screw, said each screw retaining bore having a diametrically larger root portion which has a first edge adjoining the shank retaining portion and a second edge remote from the shank retaining portion; and a plurality of removal facilitating holes formed in the belt around said each screw retaining bore in communication therewith; wherein the root portion of said each screw retaining bore is located radially outside an imaginary cone containing the first and second edges of the root portion.

The root portion of said each screw retaining bore may be diametrically constant from the second edge to a position between the first and second edges. Alternatively, the root portion of said each screw retaining bore may be convexly curved outward in cross section vertical to the belt.

Preferably, a depressed shoulder may be formed around said each screw retaining bore in a surface of the belt which is opposite to the tube.

Each of the removal facilitating holes may communicate with said each screw retaining bore via a cut which preferably extends into the shank retaining portion of said each screw retaining bore. Alternatively, the removal facilitating hole may open directly to said each screw retaining bore.

Other objects, features and advantages of the present invention will be fully understood from the following detailed description given with reference to the accompanying drawings.

BRIEF DESCRIPTION OF THE DRAWINGS

In the accompanying drawings:

FIG. 12 is a fragmentary plan view showing a screw train holding belt according to a second embodiment of the present invention;

FIG. 13 is a fragmentary plan view showing a screw train holding belt according to a third embodiment of the present invention;

FIG. 14 is a fragmentary plan view showing a screw train holding belt according to a fourth embodiment of the present invention;

FIG. 15 is a fragmentary plan view showing a screw train holding belt according to a fifth embodiment of the present invention;

FIG. 16 is a fragmentary plan view showing a screw train holding belt according to a sixth embodiment of the present invention;

FIG. 17 is a fragmentary view, in transverse section, showing a screw train holding belt according to a seventh embodiment of the present invention;

FIG. 18 is a fragmentary view, in transverse section, showing a screw train holding belt according to an eighth embodiment of the present invention;

FIG. 19 is a fragmentary plan view showing a screw train holding belt according to a ninth embodiment of the present invention;

FIG. 20 is a sectional view taken on lines XX—XX in FIG. 19;

FIG. 21 is a perspective view showing a prior art screw feeding attachment with which a screw train holding belt according to the present invention as well as a prior art screw train holding belt can be used;

FIG. 22 is a side view showing the screw feeding attachment as mounted to a screw driver main;

FIG. 23 is a side view, in longitudinal section, showing the screw feeding attachment with the screw driver main;

FIG. 24 is a fragmentary plan view showing a prior art screw train holding belt;

FIG. 25 is a sectional view taken along lines XXV—XXV in FIG. 24;

DETAILED DESCRIPTION OF THE PREFERRED EMBODIMENTS

Figure 1:
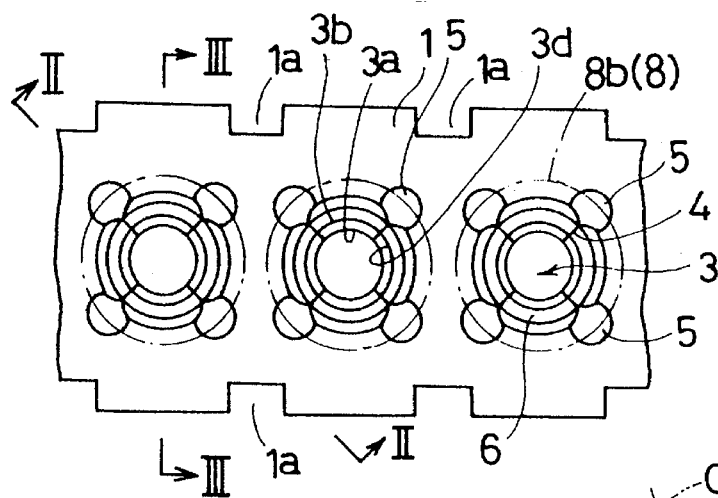
FIG. 1 is a fragmentary plan view showing a screw train holding belt according to a first embodiment of the present invention.

FIGS. 1–11 of the accompanying drawings show a screw train holding belt according to a first embodiment of the present invention. The screw train holding belt designated by reference numeral 1 is made of a soft synthetic resin and has a general condiguration which is similar to that of the prior art screw train holding belt shown in FIGS. 22–30.

Figure 2:
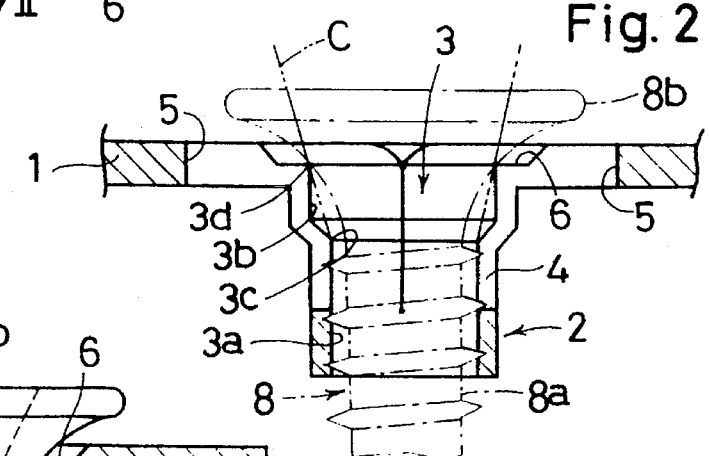
FIG. 2 is a sectional view taken on lines II—II in FIG. 1.
Figure 3:
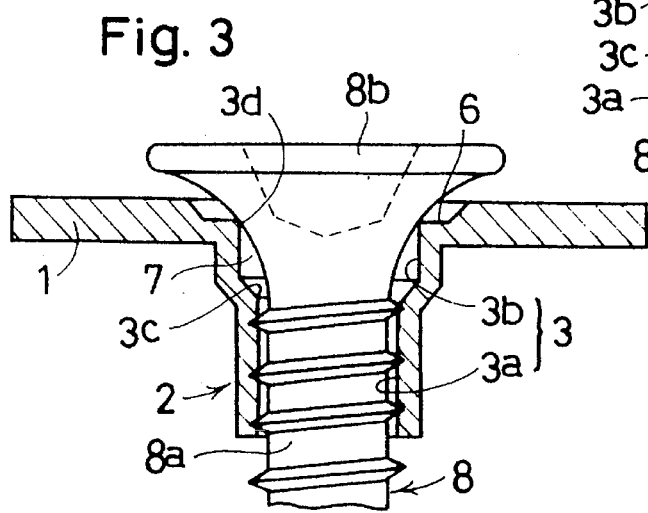
FIG. 3 is a sectional view taken on lines III—III in FIG. 1.
Figure 4:
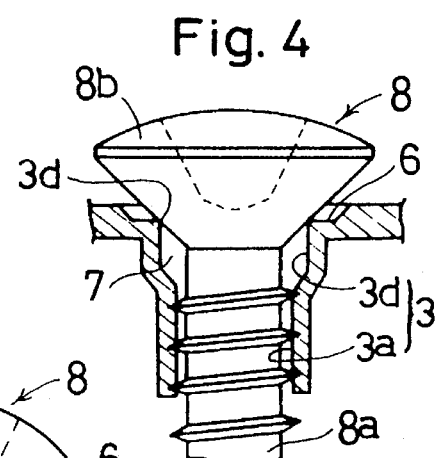
FIG. 4 is a sectional view similar to FIG. 3 but showing the same belt as used for holding another type of screws.

Specifically, as shwon in FIGS. 1–3, the screw train holding belt 1 has a pair of longitudinal edges each formed with a multiplicity of engaging notches 1a at a constant pitch. Further, the screw train holding belt 1 is also provided with a multiplicity of screw retaining bores 3 arranged along a longitudinal center line in staggered relation to the engaging notches 1a and defined by respective tubes 2 integral with the belt 1. A plurality of cuts or slits 4 radially extend from each of the screw retaining bores 3 to respective removal facilitating holes 5.

Each of the screw retaining bores 3 is configured to retain a screw 8 having a threaded shank 8a and a head 8b. Specifically, the screw retaining bore 3 has a diametrically smaller shank retaining portion 3a and a diametrically larger root portion 3b. The shank retaining portion 3a is adapted to engage the threaded shank 8a of the screw 8. The root portion 3b has its lower and upper edges 3c, 3d contained in an imaginary cone C (see FIG. 2) but is otherwise located diametrically outside the imaginary cone C. According to the first embodiment, the root portion 3b of each screw retaining bore 3 is diametrically constant from the upper edge 3d up to an intermediate depth position but then tapers to the lower edge 3c.

As shown in FIGS. 1 and 2, a depressed shoulder 6 is annularly formed in a surface of the belt 1 at each screw retaining bore 3. The depressed shoulder 6 radially terminates at the upper edge 3d of the bore root portion 3b and circumferentially interrupted by the corresponding cuts 4 and removal facilitating holes 5. Further, each of the cuts 4 associated with the removal facilitating holes 5 radially traverses the bore root portion 3b and extends vertically halfway into the shank retaining bore portion 3a (see FIG. 2). In plane view (FIG. 1), the head 8b of the screw 8 retained in the screw retaining bore B partially overlaps the removal facilitating holes 5.

The screw train holding belt 1 described above may be used to hold screws of various configurations. For example, the screw 8 may have an undercut head (FIGS. 2 and 3) which comes into contact with the upper edge 3d of the root portion 3b of each screw retaining bore 3, an oval countersunk head (FIG. 4) which also comes into contact with the upper edge 3d of the bore root portion 3b, a hexagon head (FIG. 5) which stably rests on the depressed shoulder 6 at the screw retaining bore 3, or a round head (FIG. 6) which stably rests on the belt surface itself. In either case, the shank 8a of the screw 8 engages in the shank retaining portion 3a of the screw retaining bore 3, whereas an annular clearance 7 is formed around the screw shank 8a in the bore root portion 3b.

According to the first embodiment, each screw 8 is positively supported at two portions; namely at its shank 8a and head 8b. Thus, the screw 8 can be reliably held perpendicularly to the belt surface regardless of the configuration of the screw head 8a.

Figure 5:
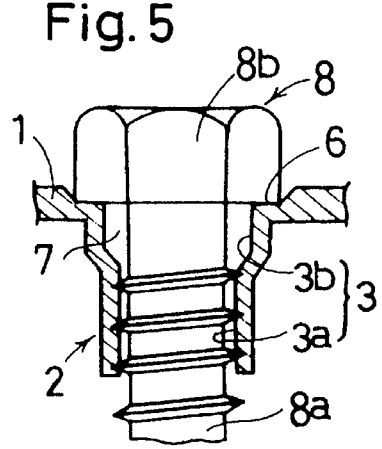
FIG. 5 is a sectional view similar to FIG. 3 but showing the same belt as used for holding a further type of screws.
Figure 6:
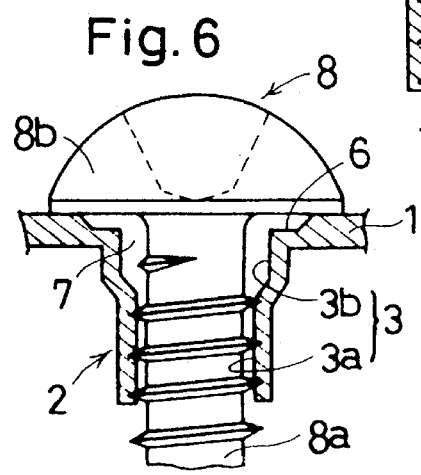
FIG. 6 is a sectional view similar to FIG. 3 but showing the same belt as used for holding still another type of screws.

As shown FIG. 5, the depressed shoulder 6 at each screw retaining bore 3 provides a convenient support for the hexagon head 8b or any other diametrically small head. Further, the provision of the depressed shoulder 6 is also preferable in that the projecting length of the bore forming tube 2 can be increased by an amount corresponding to the degree of depression, thereby improving the posture maintaining function of the screw retaining bore 3.

As previously described, the annular clearance 7 is formed around the screw shank 8a in the root portion 3b of each screw retaining bore 3 (see FIGS. 3–6). Such a clearance has been found to be advantageous at least for the following reasons.

First, due to the clearance 7, the undercut or oval countershunk head 8b (see FIGS. 2–4) of the screw 8 needs only to come into contact with the upper edge 3d of the bore root portion 3b. Therefore, the bore root portion 3b is not required to diametrically expand for adaptation to the undercut or countersunk surface of the screw head 8b. As a result, the screw train holding belt 1 can be kept substantially straight (see FIG. 10) by preventing it from warping under such expansion, and the belt 1 can be fed smoothly through the screw feeding attachment 12 (see FIGS. 21–23).

Figure 7:
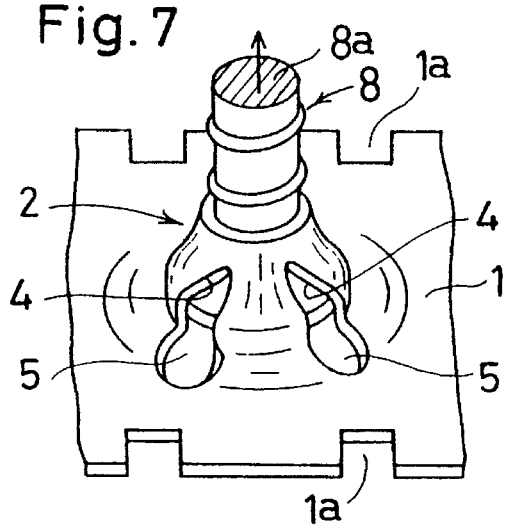
FIG. 7 is a perspective bottom view showing the same belt at the time of driving a screw.
Figure 8:
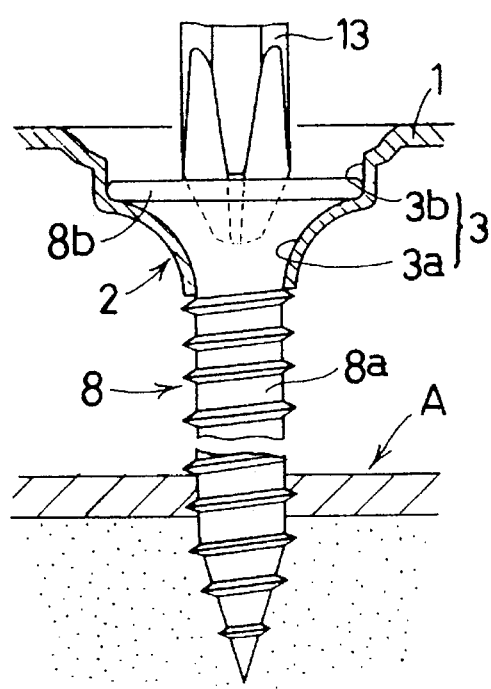
FIG. 8 is a sectional view showing the same belt at the time of the screw driving.
Figure 9:
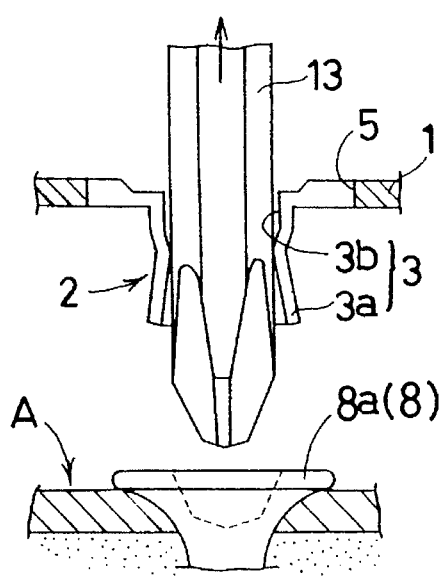
FIG. 9 is a sectional view showing the same belt after the screw driving.

Secondly, as shown in FIGS. 7 through 9, when the screw 8 is forced out the screw retaining bore 3 (or the bore forming tube 2) by the driver bit 13 (see also FIG. 23) for driving into an object A, the screw retaining bore 3 must be diametrically expanded against the elastic restoring force of the tube 2 to allow passage of the screw head 8b. However, since the amount of the diametrical expansion is reduced by the presence of the annular clearance 7, the force required for such expansion is correspondingly reduced. As a result, the screw driving operation can be facilitated. It should be appreciated in this regard that the cuts 4 and removal facilitating holes 5 associated with the screw retaining bore 3 also contribute greatly for facilitating the screw driving operation.

As shown in FIG. 8, the screw head 8b rests stably in the diametrically larger root portion 3b of the screw retaining bore 3 (which has been elastically expanded) immediately before popping out of the screw retaining bore 3. Therefore, it is possible to drive the screw 8 into the object A with a proper orientation.

Figure 11:
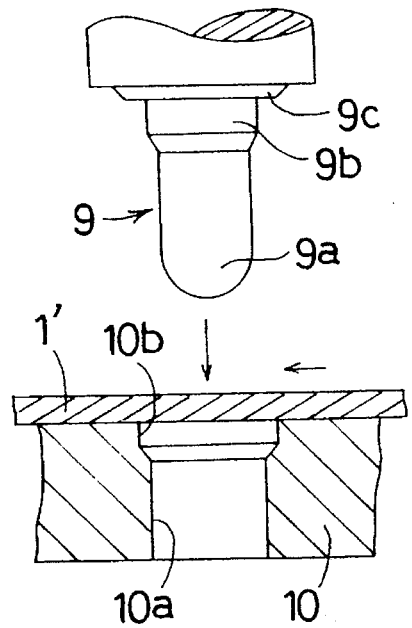
FIG. 11 is a front view, partly in transverse section, showing the method of making the belt of FIG. 1.
Figure 10:
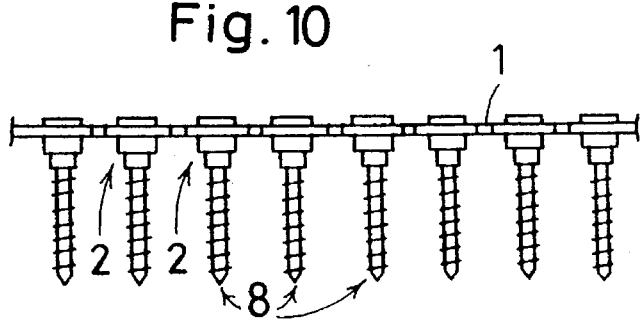
FIG. 10 is a front view similar showing the belt of FIG. 1 in a reduced scale.
Figure 26:
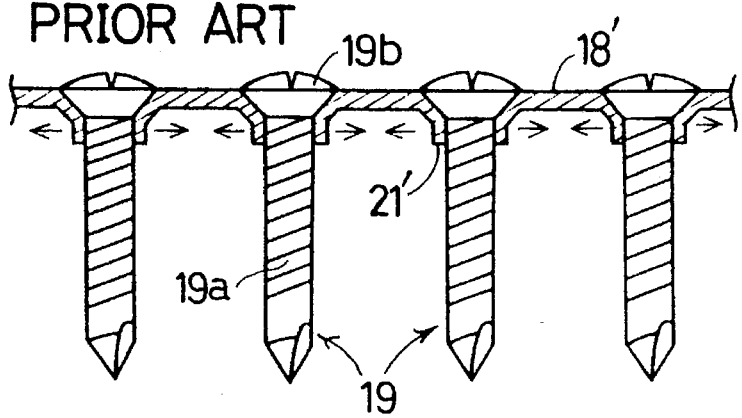
FIG. 26 is a front view, in longitudinal section, showing another prior art screw train holding belt.
Figure 27:
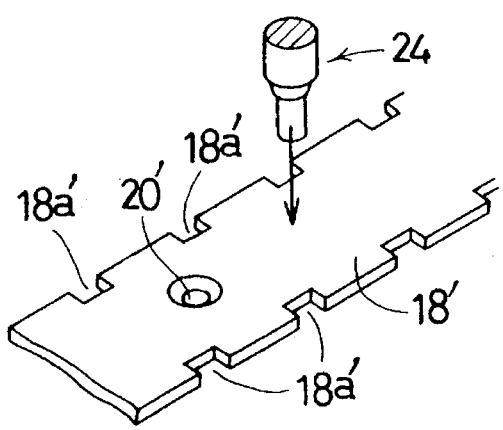
FIG. 27 is a perspective view showing a burring method used for making the prior art screw train holding belt of FIG. 26.
Figure 28:
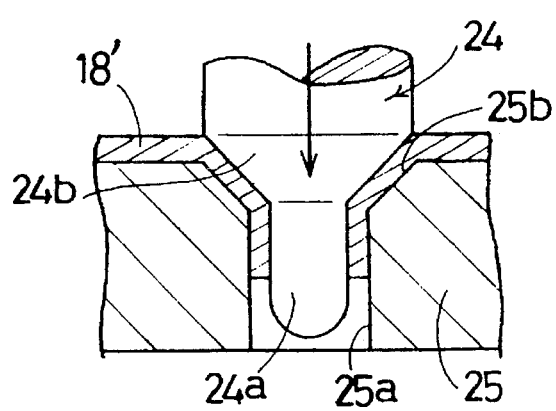
FIG. 28 is a fragmentary sectional view showing the details of the burring method.
Figure 29:
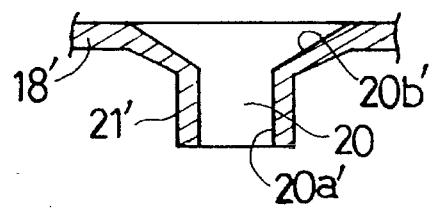
FIG. 29 is a fragmentary sectional view showing the spring back phenomenon occurring after the burring.
Figure 30:
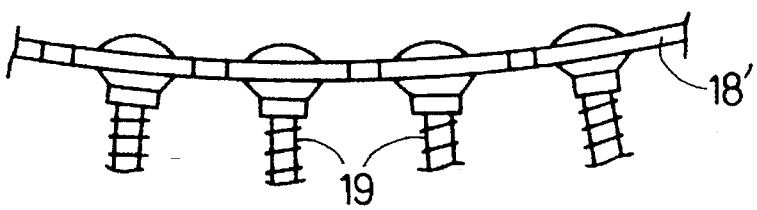
FIG. 30 is a front view showing the warping of the prior art belt illustrated in FIG. 26.

As shown in FIG. 11, each screw retaining bore 3 of the screw train holding belt 1 may be formed by subjecting a belt blank 1' to a burring method which uses, in combination, a punch 9 and a die 10. The punch 9 has a diametrically smaller shaft portion 9a, a diametrically larger shaft portion 9b, and a diametrically largest base projection 9c. The die 10 has a diametrically smaller bore portion 10a cooperative with the diametrically smaller shaft portion 9a of the punch 9, and a diametrically larger bore portion 10b corresponding to the diametrically larger shaft portion 9b of the punch 9. Apparently, the base projection 9c forms the depressed shoulder 6 at the screw retaining bore B (see FIGS. 1–6).

As described above, the undercut or oval countershunk head 8b (see FIGS. 2–4) of the screw 8 need only come into contact with the upper edge 3d of the bore root portion 3b. In other words, the undercut or oval countershunk head 8b need not come into full face to face contact with the bore root portion 3b. Thus, it is unnecessary to form the bore root portion 3b with strict dimensional accuracy, so that the burring operation described above may be conveniently performed without paying attention to dimensional accuracy.

The engaging notches 1a may be formed by punching the belt blank 1' or belt 1 either before or after forming each screw retaining bore 3 by the burring described above. Further, the cuts 4 and removal facilitating holes 5 may be formed simultaneously or separately by punching and/or cutting after the burring. It should be appreciated that the cuts or slits 4 may be made to have a larger width than illustrated in FIG. 1.

As an alternative to the burring and punching (or cutting) described above, the screw train holding belt 1 may be made by injection molding.

The configuration of each removal facilitating hole 5 is optional. For example, the removal facilitating hole 5 may be ellipsoidal (second embodiment shown in FIG. 12), triangular or sector-shaped (third embodiment shown in FIG. 13), square (fourth embodiment shown in FIG. 12), generally crescent (fifth embodiment shown in FIG. 15), or shaped like a waterdrop (seventh embodiment shown in FIG. 16). Further, each cut 4 may start from the upper edge 3d of the root portion 3b of the screw retaining bore 3, as shown in FIG. 16 showing the seventh embodiment.

FIG. 17 shows an eighth embodiment of the present invention which is similar to the first embodiment but differs therefrom only in that there is no depressed shoulder (see the element 6 in FIGS. 1–6).

FIG. 18 shows a ninth embodiment of the present invention which is similar to the eighth embodiment but differs therefrom only in that each screw retaining bore 3 is made to have a root portion 3b which is convexly curved outward to be located outside the cone C which contains the lower and upper edges 3c, 3d of the bore root portion 3b.

FIGS. 19 and 20 show a tenth embodiment of the present invention which is similar to the first embodiment (FIGS.

1–6) but differs therefrom in that each removal facilitating hole 5 which directly opens to the corresponding screw retaining bore 3. Thus, in this embodiment, there is no distinct cut associated with the removal facilitating hole 5 which itself provides the function of a cut.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

I claim:

1. A resinous belt holding a train of screws and a train of screws held by said belt, each of the screws having a shank and a head, the belt comprising:

a series of screw retaining bores formed in the belt at a predetermined pitch longitudinally of the belt, each of the screw retaining bores being defined by a tube, each said screw retaining bore having a diametrically smaller shank retaining portion for engagement with the shank of a corresponding screw, each said screw retaining bore having a diametrically larger root portion which has a first edge adjoining the shank retaining portion and a second edge remote from the shank retaining portion; and a plurality of removal facilitating holes formed in the belt around each said screw retaining bore in communication therewith;

wherein the root portion of each said screw retaining bore has an intermediate portion which is located radially outside an imaginary cone defined by the first and second edges of the root portion; and wherein the second edge of the root portion is diametrically smaller than the head of said corresponding screw.

2. The belt according to claim 1, wherein the root portion of each said screw retaining bore is diametrically constant from the second edge to a position between the first and second edges.

3. The belt according to claim 2, wherein the root portion of each said screw retaining bore is diametrically constant from the second edge to a position beyond a surface of the belt from which the tube projects.

4. The belt according to claim 1, wherein the root portion of each said screw retaining bore is convexly curved outward in cross section vertical to the belt.

5. The belt according to claim 1, further comprising a depressed shoulder around each said screw retaining bore in a surface of the belt which is opposite to the tube, each depressed shoulder being diametrically larger than the root portion of each said screw retaining bore.

6. The belt according to claim 1, wherein each of the removal facilitating holes communicates with each said screw retaining bore via a cut.

7. The belt according to claim 6, wherein the cut of each removal facilitating hole extends into a tubular wall defining the shank retaining portion of each said screw retaining bore.

8. The belt according to claim 1, wherein each of the removal facilitating holes opens directly to each said screw retaining bore.

9. The belt according to claim 1, wherein each of the removal facilitating holes is partially covered by the head of the screw.

\* \* \* \* \*